United States Patent
Takemasa

(10) Patent No.: US 11,683,463 B2
(45) Date of Patent: Jun. 20, 2023

(54) METHOD FOR CONTROLLING ELECTRONIC DEVICE

(71) Applicant: Japan Display Inc., Tokyo (JP)

(72) Inventor: Kenichi Takemasa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/453,940

(22) Filed: Nov. 8, 2021

(65) Prior Publication Data
US 2022/0150463 A1    May 12, 2022

(30) Foreign Application Priority Data

Nov. 9, 2020    (JP) .............................. JP2020-186636

(51) Int. Cl.
*H04N 13/211*    (2018.01)

(52) U.S. Cl.
CPC ................................ *H04N 13/211* (2018.05)

(58) Field of Classification Search
CPC .. H04N 13/211; H04N 5/232; H04N 5/23241; H04N 23/60; H04N 23/65
USPC ......................................................... 348/49
See application file for complete search history.

(56) References Cited

U.S. PATENT DOCUMENTS

| | | | |
|---|---|---|---|
| 2005/0128332 A1 | 6/2005 | Tsuboi | |
| 2013/0321366 A1* | 12/2013 | Kozuma | G09G 3/34 |
| | | | 345/204 |
| 2019/0068870 A1* | 2/2019 | Miyakawa | H04N 5/91 |

FOREIGN PATENT DOCUMENTS

| | | | |
|---|---|---|---|
| JP | 07-115574 A | | 5/1995 |
| JP | 07115574 A | * | 5/1995 |
| JP | 08-046162 A | | 2/1996 |
| JP | 2000-152205 A | | 5/2000 |
| JP | 2000152205 A | * | 5/2000 |
| JP | 2005-176151 A | | 6/2005 |

OTHER PUBLICATIONS

Machine translation of JPH07115574 A (Year: 1995).*
Machine translation of JP 2000152205 A (Year: 2000).*

* cited by examiner

*Primary Examiner* — Christopher S Kelley
*Assistant Examiner* — Ana Picon-Feliciano
(74) *Attorney, Agent, or Firm* — Maier & Maier, PLLC

(57) ABSTRACT

According to one embodiment, a method for controlling an electronic device includes illuminating an object while moving a light emitting area formed by turning on light emitting elements simultaneously, capturing a shadow generated by the object by image sensing elements on a same substrate as the light emitting elements, and creating three-dimensional data about an outer shape of the object based on a shadow image.

4 Claims, 16 Drawing Sheets

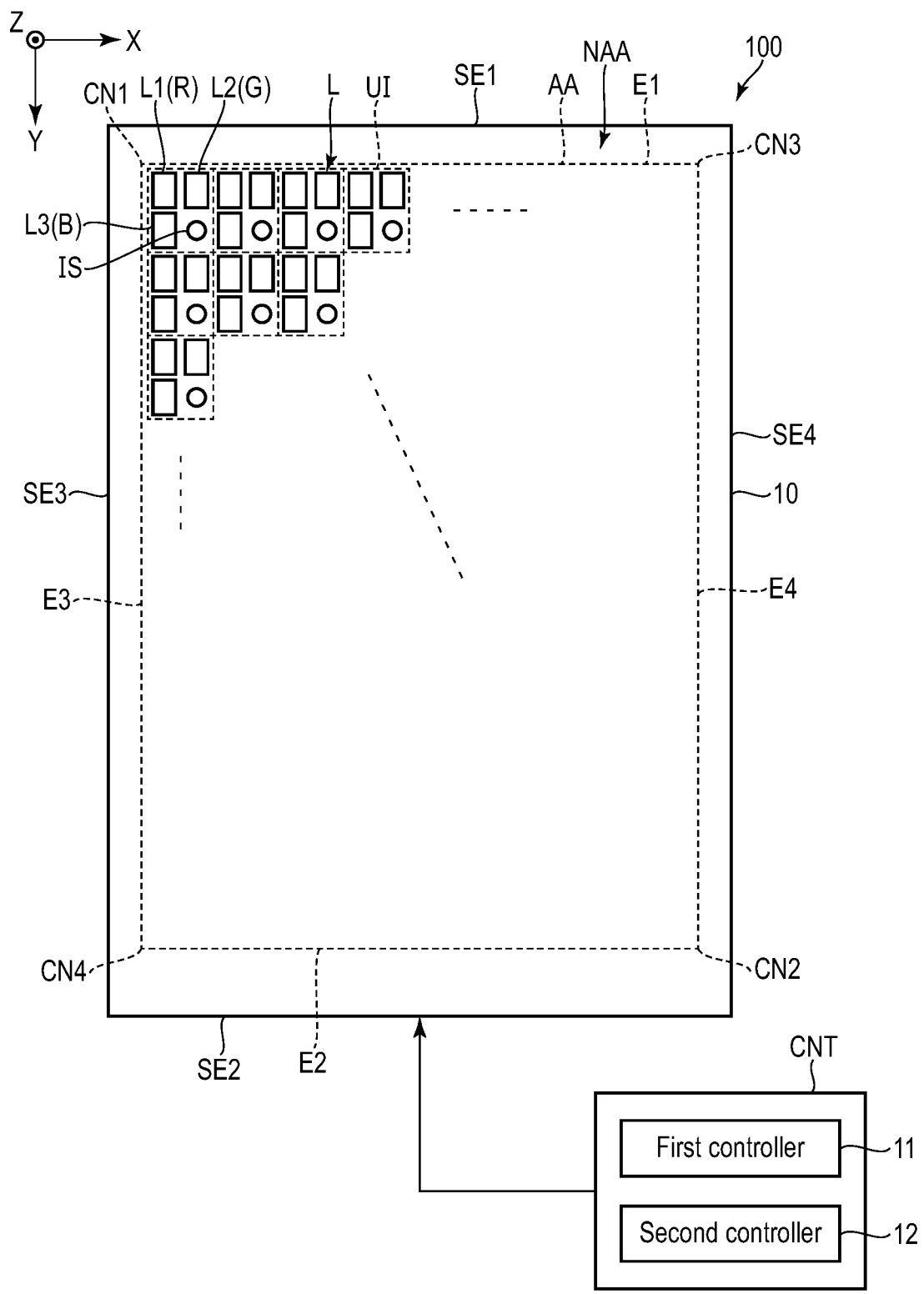
F I G. 1

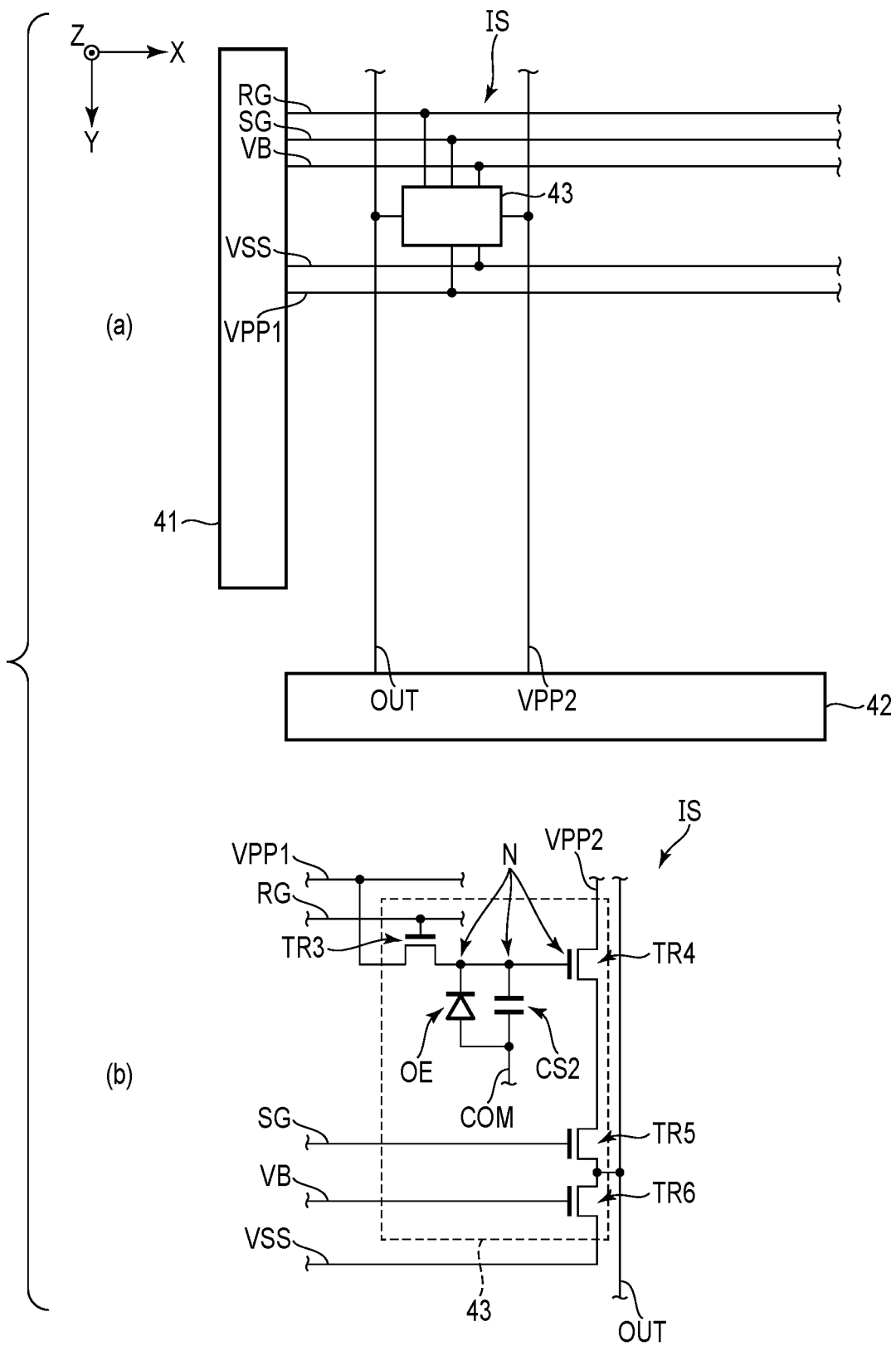
F I G. 2B

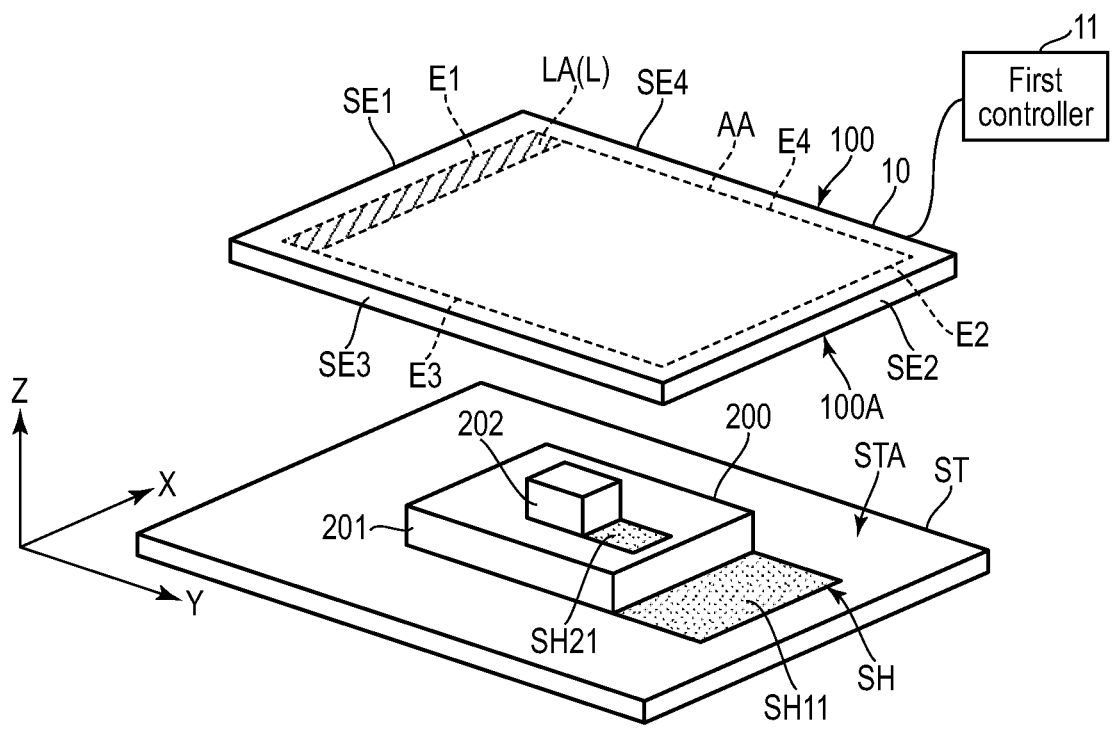
F I G. 3
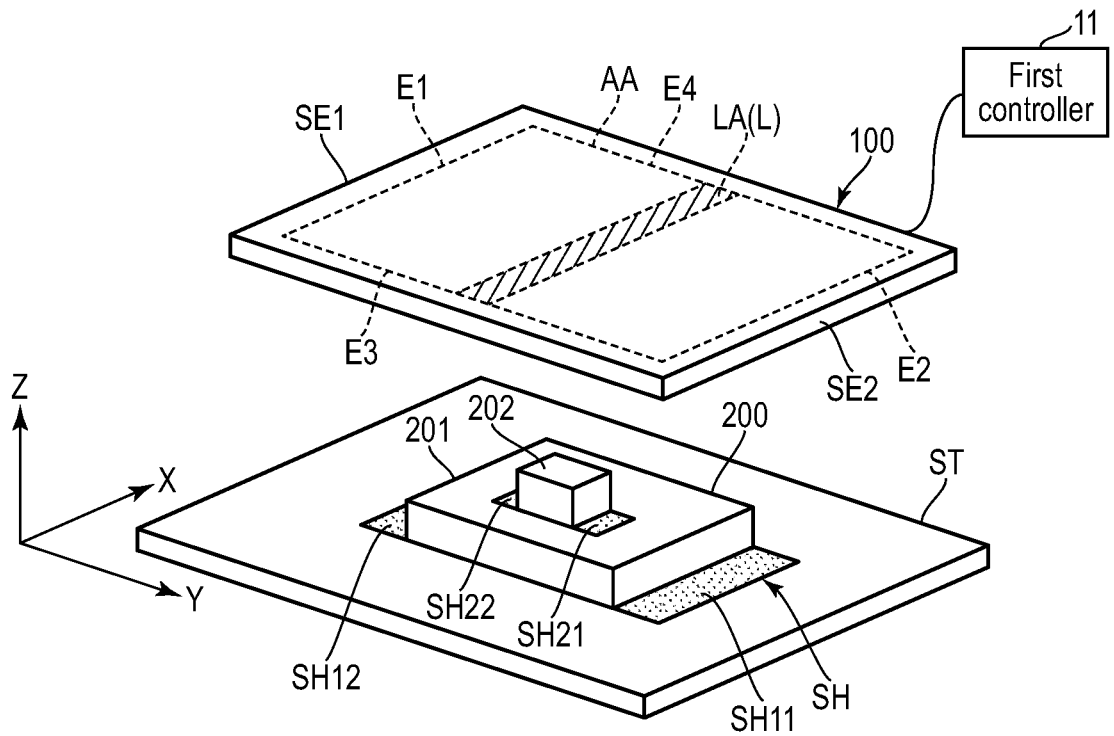
F I G. 4

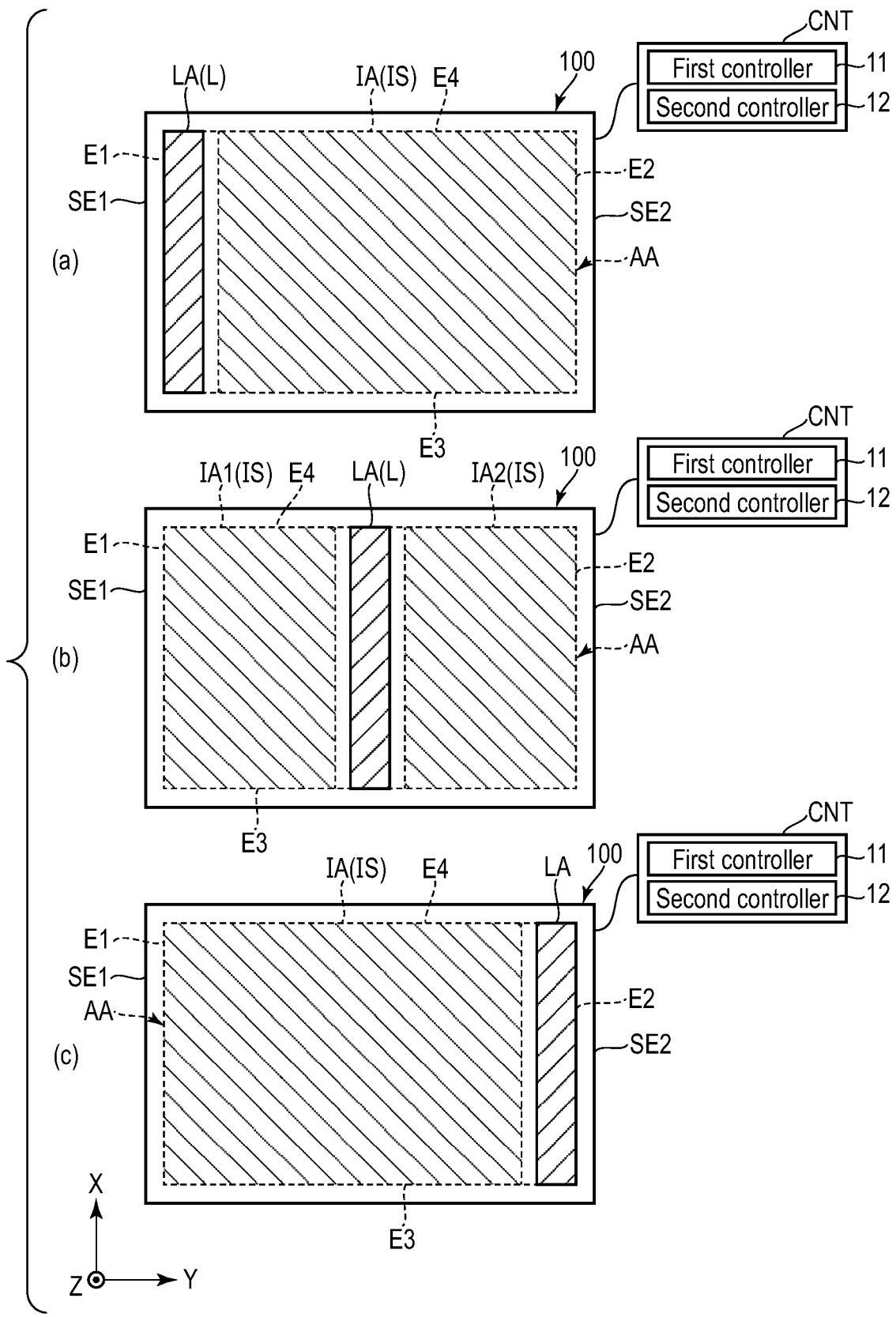
F I G. 6

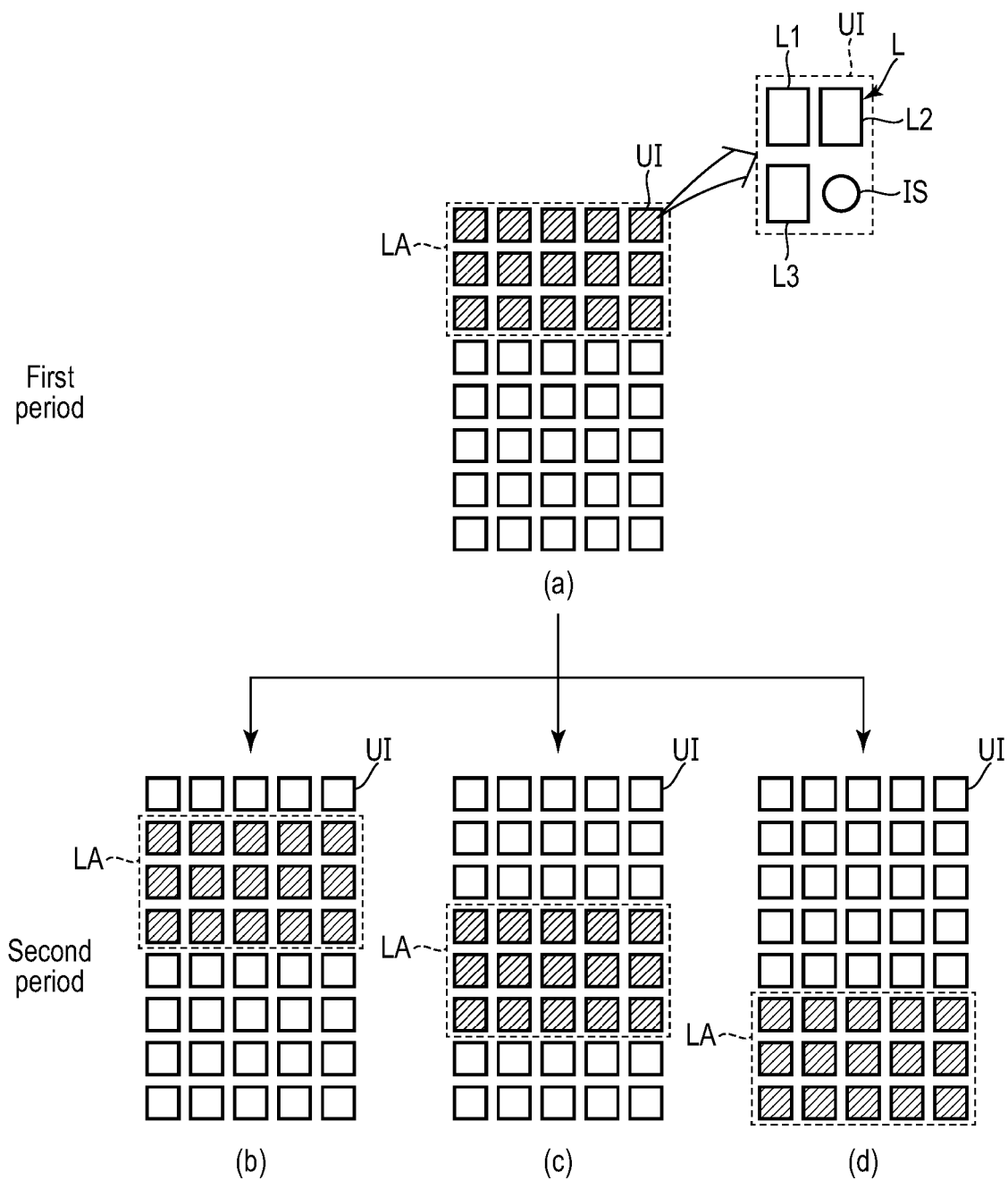
F I G. 8

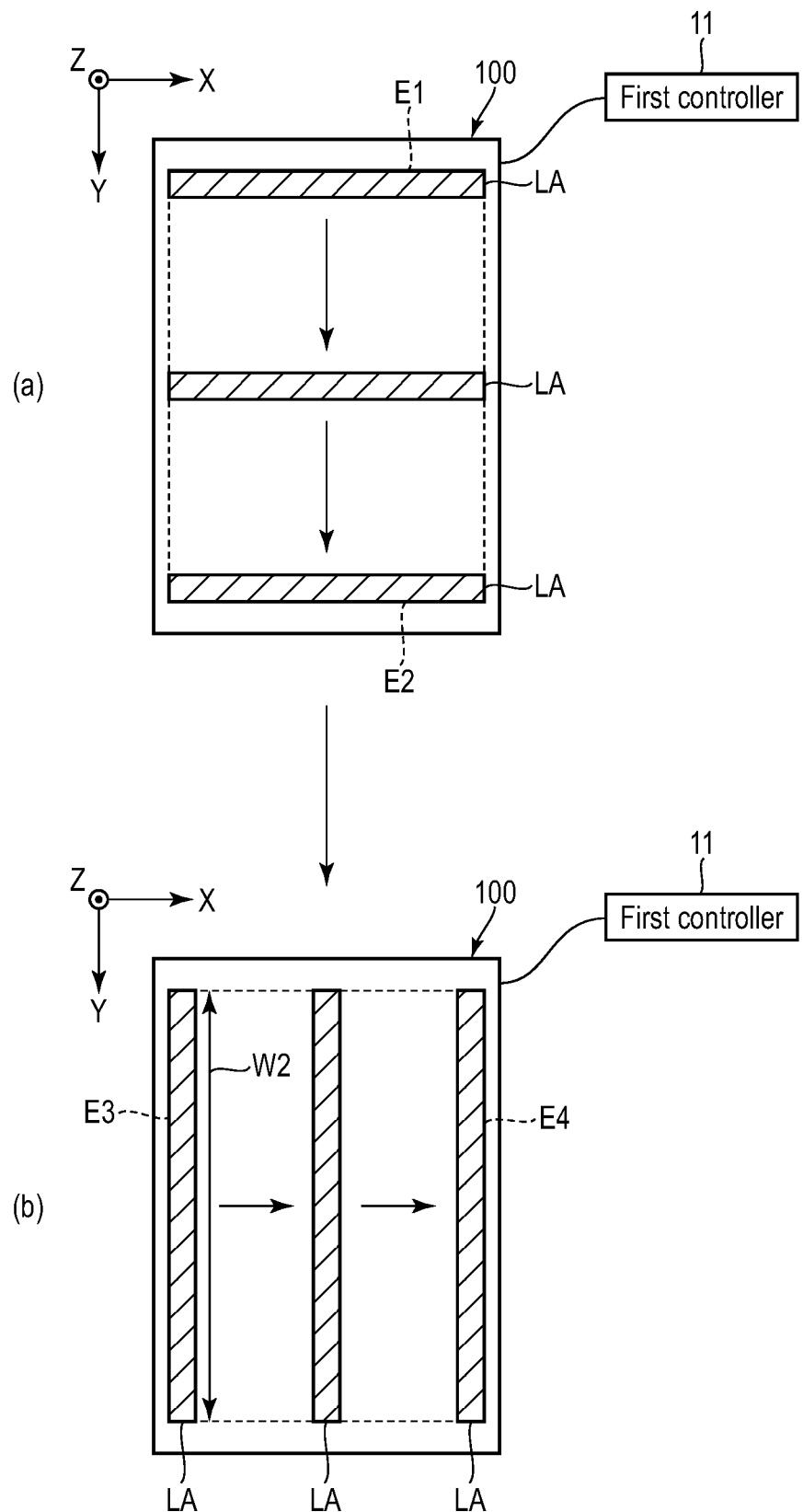
F I G. 11

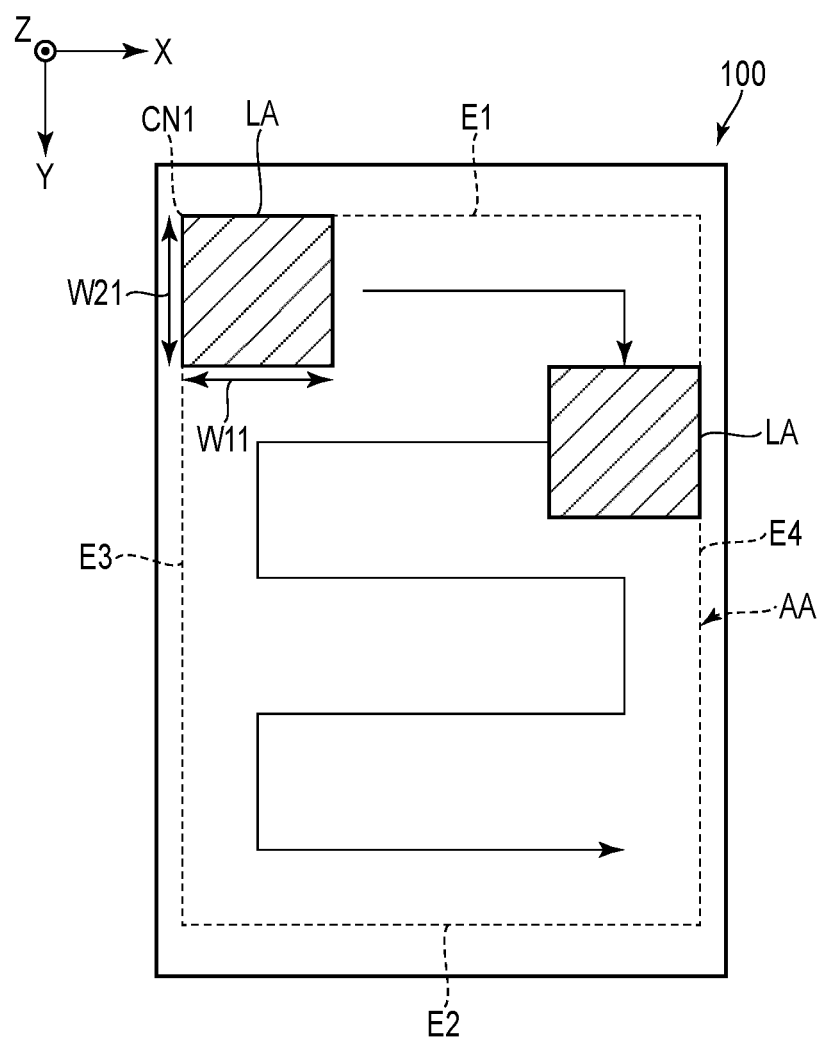
F I G. 13

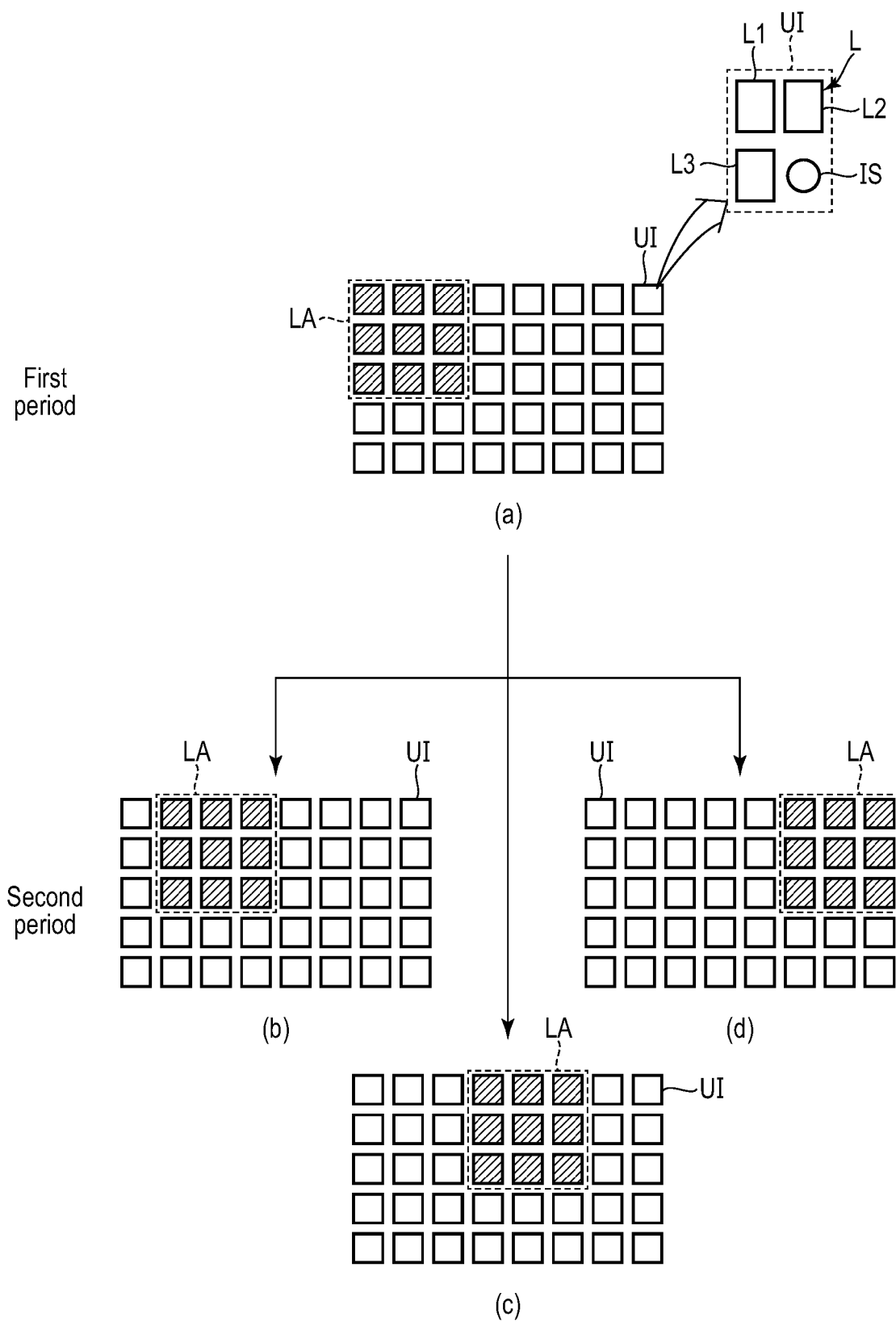
F I G. 14

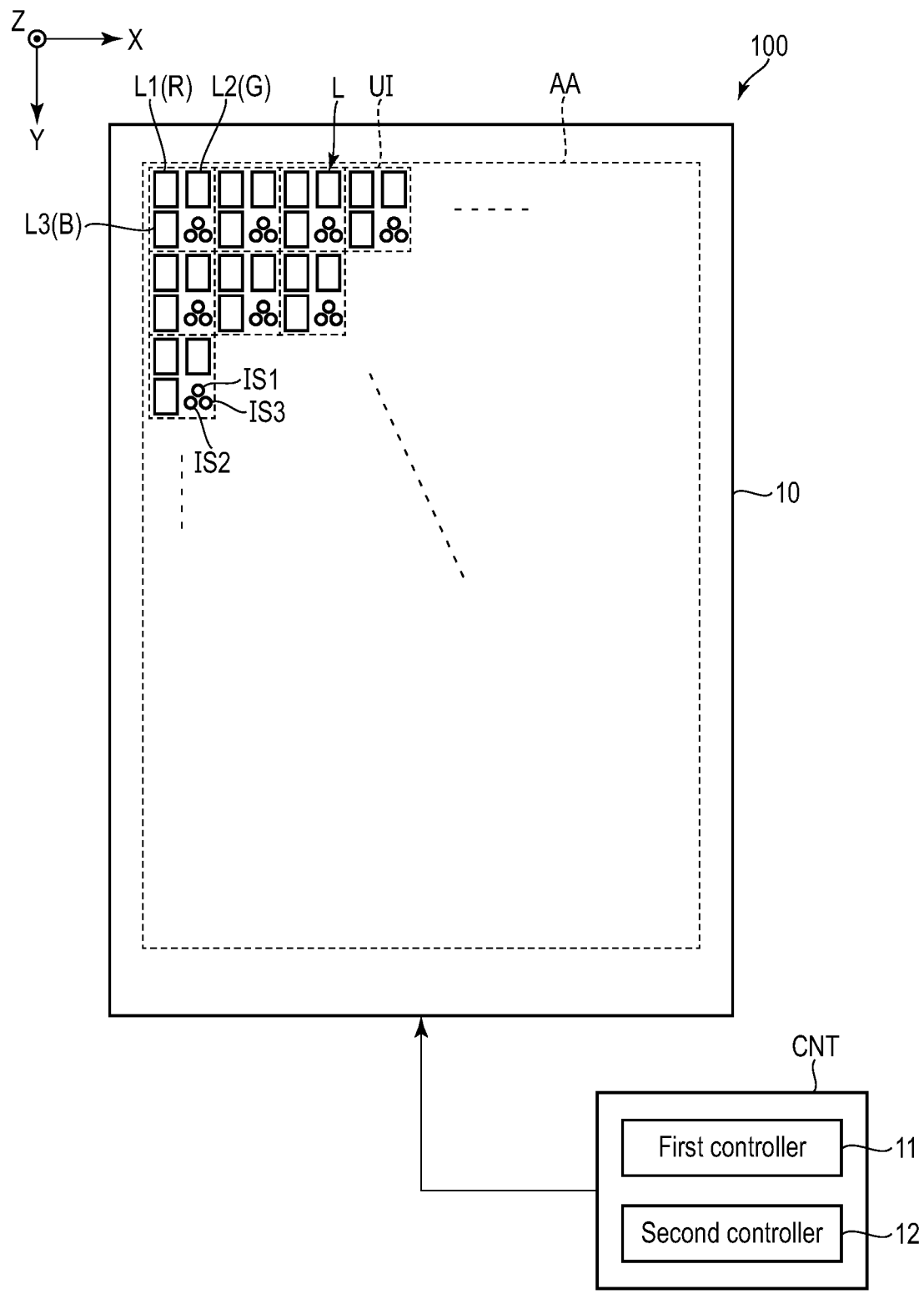
F I G. 16

METHOD FOR CONTROLLING ELECTRONIC DEVICE

CROSS-REFERENCE TO RELATED APPLICATIONS

This application is based upon and claims the benefit of priority from Japanese Patent Application No. 2020-186636, filed Nov. 9, 2020, the entire contents of which are incorporated herein by reference.

FIELD

Embodiments described herein relate generally to a method for controlling an electronic device.

BACKGROUND

Generally, LED display devices using light emitting diodes (LEDs) which are self-luminous light emitting elements are known. Recently, a display device using a minute diode element called a micro-LED has been developed as a higher-definition display device. Unlike a conventional liquid crystal display device and an organic EL display device, this micro-LED display device is formed such that a large number of chip-like micro-LEDs are mounted in a display area. Therefore, this micro-LED display device can achieve both a higher definition and a larger size, and has been attracting attention as a next-generation display device.

In addition, a display device where an image sensing element is arranged in a display area has been developed. In such a display device, an object opposed to a display surface can be captured.

BRIEF DESCRIPTION OF THE DRAWINGS

FIG. 1 is a plan view schematically showing an electronic device according to the present embodiment.

FIG. 2B is an illustration showing the equivalent circuit of the electronic device shown in FIG. 1.

FIG. 3 is a perspective view showing a state where a light emitting area is located close to a side of an effective area.

FIG. 4 is a perspective view showing a state where the light emitting area is located in the middle of sides of the effective area.

FIG. 6 is a plan view showing the positional relationship between the light emitting area and an image sensing area.

FIG. 8 is an illustration schematically showing the light emitting area in the first period and the second period regarding the movement of the light emitting area shown in FIG. 7.

FIG. 11 is a plan view showing an operation where the light emitting area scans the inside of the effective area in two directions.

FIG. 13 is a plan view showing another example of the operation where the light emitting area scans the inside of the effective area.

FIG. 14 is an illustration schematically showing the light emitting area in the first period and the second period regarding the movement of the light emitting area shown in FIG. 13.

FIG. 16 is a plan view schematically showing another example of the electronic device according to the present embodiment.

DETAILED DESCRIPTION

Figure 2A:
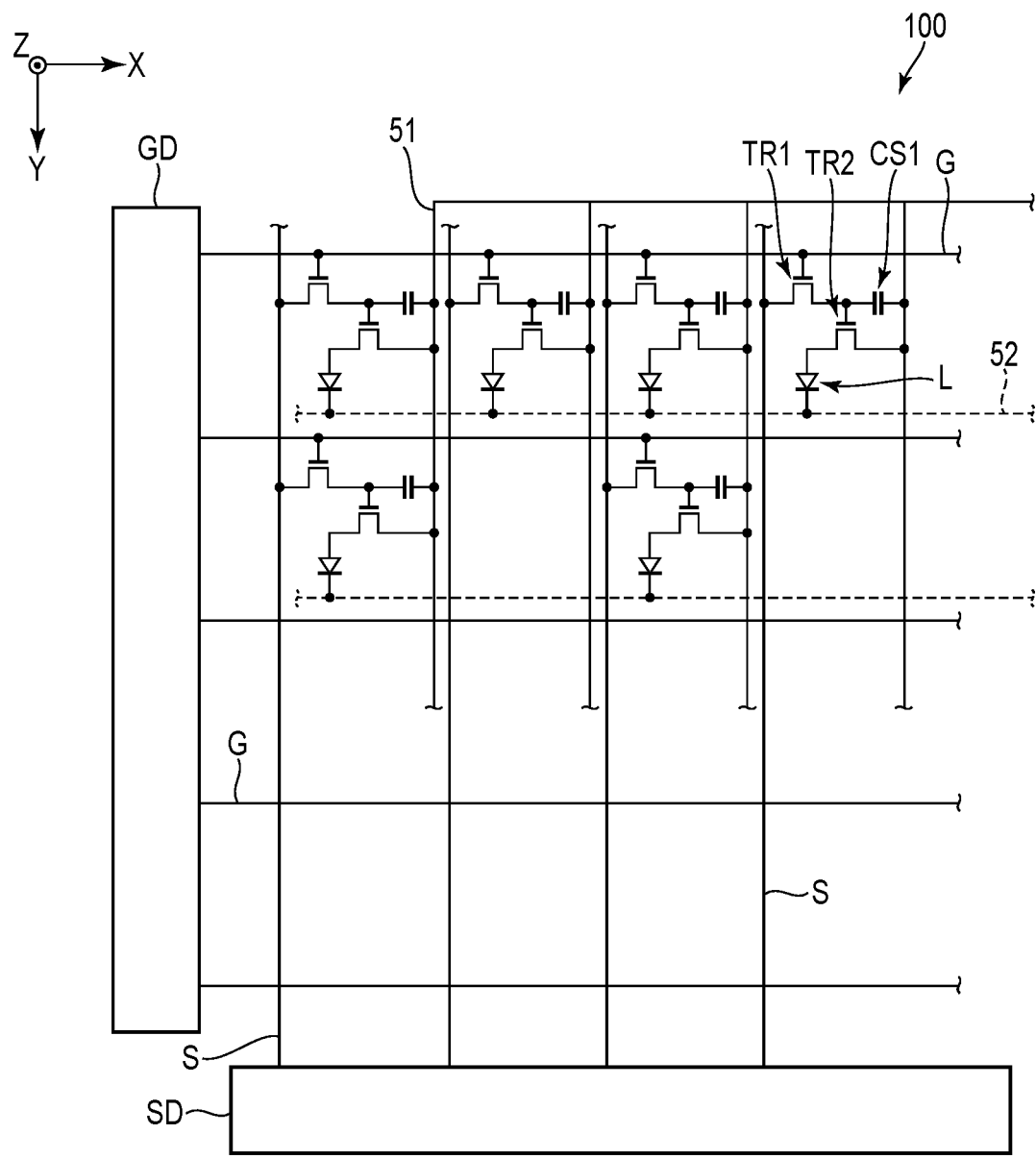
FIG. 2A is an illustration showing the equivalent circuit of the electronic device shown in FIG. 1.

In general, according to one embodiment, there is provided a method for controlling an electronic device comprising illuminating an object while moving a light emitting area formed by turning on a plurality of light emitting elements simultaneously, capturing a shadow generated by the object by a plurality of image sensing elements on a same substrate as the light emitting elements, and creating three-dimensional data about an outer shape of the object based on a shadow image.

The present embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed description thereof which is considered redundant is omitted where appropriate.

First, the configuration of an electronic device 100 will be described with reference to FIGS. 1, 2A and 2B.

FIG. 1 is a plan view schematically showing the electronic device 100 according to the present embodiment. The electronic device 100 of the present embodiment is, for example, a light emitting diode (LED) display device.

A first direction X, a second direction Y and a third direction Z shown in the drawing are orthogonal to each other. It should be noted that the first direction X, the second direction Y and the third direction Z may intersect at an angle other than 90 degrees. In the specification, a direction toward the tip of an arrow indicating the third direction Z is referred to as above, and a direction from the tip of the arrow toward the opposite side is referred to as below. In addition, an observation position from which the electronic device 100 is observed is assumed to be located on the tip side of the arrow indicating the third direction Z, and viewing from this observation position toward an X-Y plane defined by the first direction X and the second direction Y is referred to as planar view.

The electronic device 100 comprises an insulating substrate 10, a plurality of light emitting elements L, a plurality of image sensing elements IS, and a controller CNT. The insulating substrate 10 is formed of glass, resin or the like.

The light emitting elements L are mounted on the insulating substrate 10. The light emitting elements L are arranged in a matrix in the first direction X and the second direction Y. The light emitting elements L are, for example, LEDs having a size of around 100 μm or a size of less than 100 μm such as mini-LEDs or micro-LEDs. The light emitting elements L include a light emitting element L1 which emits red (R) light, a light emitting element L2 which emits green (G) light, and a light emitting element L3 which emits blue (B) light.

The image sensing elements IS are mounted on the insulating substrate 10. That is, the image sensing elements IS are located on the same substrate as the light emitting elements L. The image sensing elements IS are arranged in a matrix in the first direction X and the second direction Y.

The electronic device 100 has an effective area AA and a non-effective area NAA outside the effective area AA. In the illustrated example, the non-effective area NAA surrounds the effective area AA. The light emitting elements L and the image sensing elements IS are arranged in the effective area AA, and the effective area AA corresponds to an area capable of light emission and an area capable of image sensing. In addition, the effective area AA corresponds to an area where an image is displayed when the electronic device 100 is a display device.

The effective area AA comprises a plurality of unit areas UI arranged in a matrix in the first direction X and the second direction Y. The unit area UI is composed of three light emitting elements L1, L2 and L3 and one image sensing element IS. Inside the unit area UI, the light emitting element L2 is arranged in the first direction X of the light emitting element L1. The light emitting element L3 is arranged in the second direction Y of the light emitting element L1. The image sensing element IS is arranged in the first direction X of the light emitting element L3 and in the second direction Y of the light emitting element L2. The unit area UI can be referred to as a pixel when the electronic device 100 is a display device.

In the entire effective area AA, the light emitting elements L are arranged in the first direction X in even-numbered rows, and the light emitting element L and the image sensing element IS are alternately arranged in the first direction X in odd-numbered rows. In addition, the light emitting elements L are arranged in the second direction Y in even-numbered columns, and the light emitting element L and the image sensing element IS are alternately arranged in the second direction Y in odd-numbered columns.

The controller CNT comprises a first controller 11 and a second controller 12. The first controller 11 controls the drive of the light emitting elements L. The second controller 12 controls the drive of the image sensing elements IS.

The electronic device 100 is formed in a rectangular shape in the illustrated example. The electronic device 100 has side edges SE1 and SE2 which extend in the first direction X, and side edges SE3 and SE4 which extend in the second direction Y. The side edges SE1 and SE2 are short sides, and the side edges SE3 and SE4 are long sides. In addition, the effective area AA is formed in a rectangular shape in the illustrated example. The effective area AA has sides E1 and E2 which extend in the first direction X, and sides E3 and E4 which extend in the second direction Y. The sides E1 and E2 are short sides, and the sides E3 and E4 are long sides. The side E1 is located close to the side edge SE1, the side E2 is located close to the side edge SE2, the side E3 is located close to the side edge SE3, and the side E4 is located close to the side edge SE4. The effective area AA has a corner CN1 located at a position where the side E1 and the side E3 intersect, a corner CN2 located at a position where the side E2 and the side E4 intersect, a corner CN3 located at a position where the side E1 and E4 intersect, and a corner CN4 at a position where the side E2 and the side E3 intersect.

The electronic device 100 of the present embodiment illuminates an object by emitting light from part of the light emitting elements L, and captures a shadow generated around the object by the image sensing elements IS. The electronic device 100 continually changes the area where the light emitting elements L emit light, reads changes in the generated shadow, and creates three-dimensional data about the three-dimensional structure of the object.

It should be noted that, although the electronic device 100 is a display device in the above example, the electronic device 100 may not have a display function but may only have a function of illuminating an object by the light emitting elements L. When the electronic device 100 is not a display device, all the light emitting elements L may emit the same color light. In addition, the image sensing elements IS may not be arranged in all the unit areas UI, but one image sensing element IS may be arranged in every plurality of unit areas UI. Furthermore, the light emitting elements L and the image sensing elements IS are shown by solid lines but are mounted on the lower side of the insulating substrate 10 (in a direction from the tip of the arrow indicating the third direction Z toward the opposite side).

FIG. 2A is an illustration showing the equivalent circuit of the electronic device 100 shown in FIG. 1. FIG. 2A is a typical circuit diagram for driving the light emitting element L using two types of thin-film transistor (switching transistor and drive transistor). FIG. 2A shows the equivalent circuit of the light emitting element L and omits the illustration of the circuit of the image sensing element IS.

The electronic device 100 comprises a gate line G (referred to also as a scanning line), a source line S (referred to also as an image signal line), a first thin-film transistor TR1, a second thin-film transistor TR2, the light emitting element L, a capacitance element CS1, a first power line 51, a second power line 52, a gate driver GD, and a source driver SD.

The gate lines G extend in the first direction X, and are arranged at intervals in the second direction Y. The source lines S extend in the second direction Y, and are arranged at intervals in the first direction X. In an area delimited by the adjacent source lines S and the adjacent gate lines G, the first thin-film transistor TR1 (switching transistor), the second thin-film transistor TR2 (drive transistor), the light emitting element L, the capacitance element CS1 and the like are arranged.

The second thin-film transistor TR2 is connected to the first power line 51. The first power line 51 is a power supply line which supplies a current to the light emitting element L. The light emitting element L comprises an anode and a cathode. The first power line 51 is connected to one electrode, for example, the anode of the light emitting element L via the second thin-film transistor TR2. The second power line 52 is connected to the other electrode, for example, the cathode of the light emitting element L. The second power line 52 is maintained at, for example, a constant potential which is a ground potential.

The source electrode of the first thin-film transistor TR1 is electrically connected to the source line S. The gate electrode of the first thin-film transistor TR1 is electrically connected to the gate line G. The drain electrode of the first thin-film transistor TR1 is electrically connected to the gate electrode of the second thin-film transistor TR2. The drain electrode of the second thin-film transistor TR2 is electrically connected to the first power line 51. The source electrode of the second thin-film transistor TR2 is electrically connected to one electrode, for example, the anode of the light emitting element L. An image signal from the source line S is input to the gate electrode of the second thin-film transistor TR2 via the first thin-film transistor TR1, and the second thin-film transistor TR2 drives the light emitting element L.

The capacitance element CS1 is disposed between the drain electrode and the gate electrode of the second thin-film transistor TR2, in other words, between the first power line 51 and the gate electrode of the second thin-film transistor TR2. Since a constant potential is applied to the first power line 51, the potential of the gate electrode of the second thin-film transistor TR2 is held for a predetermined period by the capacitance element CS1. The capacitance element CS1 may be disposed, for example, between the source electrode and the gate electrode of the second thin-film transistor TR2.

The gate line G is connected to the gate driver GD including a shift resister, and the source line S is connected to the source driver SD including a shift register, a video line and an analog switch. That is, the gate driver GD and the source driver SD function as controllers which control the light emitting element L, and are included in the first controller 11 described above.

When the first thin-film transistor TR1 is turned on according to a gate signal from the gate line G, an image signal from the source line S is input to the gate electrode of the second thin-film transistor TR2 via the first thin-film transistor TR1. Accordingly, a current corresponding to the magnitude of the image signal is supplied from the first power line 51 to the light emitting element L via a channel layer of the second thin-film transistor TR2, and the light emitting element L emits light according to the amount of the current.

FIG. 2B is an illustration showing the equivalent circuit of the electronic device 100 shown in FIG. 1. FIG. 2B shows the circuit of the image sensing element IS which is omitted in FIG. 2A. Since the circuit of the light emitting element L is shown in FIG. 2A, the illustration is omitted here.

FIG. 2B (a) shows the connection relationship between various wiring lines connected to the image sensing element IS and a row selection circuit 41 and a read circuit 42.

As shown in FIG. 2B (a), a reset signal scanning line RG, a selection scanning line SG, a bias voltage supply signal line VB, a reference potential line VSS and a first drive power line VPP1 are drawn from the row selection circuit 41 and are arranged at intervals in the second direction Y. In addition, an output signal line OUT and a second drive power line VPP2 are drawn from the read circuit 42 and are arranged at an interval in the first direction X. The various wiring lines connected to the row selection circuit 41 and the read circuit 42 are connected to a detection circuit 43 of the image sensing element IS. The row selection circuit 41 and the read circuit 42 function as controllers which control the image sensing element IS, and are included in the second controller 12 described above.

FIG. 2B (b) shows the detection circuit 43 of the image sensing element IS.

The detection circuit 43 has a reset transistor TR3, a drive transistor TR4, a selection transistor TR5, a load transistor TR6, a photoelectric conversion element OE and a capacitance element CS2. The equivalent circuit shown in FIG. 2B (b) is merely exemplary, but as shown in the drawing, the equivalent circuit of the image sensing element IS has a plurality of transistors, a capacitance element and a photoelectric conversion element.

The drive transistor TR4, the selection transistor TR5 and the load transistor TR6 constitute a source follower. The source follower passes a current from the second drive power line VPP2 to the reference potential line VSS, and outputs an output signal corresponding to a voltage supplied to the gate electrode of the drive transistor TR4 to the output signal line OUT.

As a power source for driving the image sensing element IS, a first drive potential is supplied from the first drive power line VPP1, a second drive potential is supplied from the second drive power line VPP2, a reference potential is supplied from the reference potential line VSS, and a common potential is supplied from a common potential line COM.

The reset transistor TR3 supplies the first drive potential of the first drive power line VPP1 to a node N based on a reset signal supplied from the reset signal scanning line RG, and sets the potential of the image sensing element IS to a reset state or an initialized state. The node N is connected to the gate electrode of the drive transistor TR4, the anode of the photoelectric conversion element OE, and one end of the capacitance element CS2.

The drive transistor TR4 adjusts the current flowing to the source follower of the image sensing element IS in the reset state or the initialized state using the input first drive potential. In addition, the drive transistor TR4 adjusts the current flowing to the source follower using photovoltaic power generated based on the light reception of the photoelectric conversion element OE when the image sensing element IS is exposed to light.

The selection transistor TR5 controls whether or not to drive the source follower based on a selection scanning signal supplied from the selection scanning line SG.

The load transistor TR6 passes a constant current from the second drive potential line VPP2 to the reference potential line VSS based on a bias voltage supply signal supplied from the bias voltage supply line VB, and the load transistor TR6 becomes a constant current source.

The capacitance element CS2 holds a charge corresponding to the first drive voltage supplied to the node N. In addition, the capacitance element CS2 holds a charge corresponding to the photovoltaic power generated based on the light reception of the photoelectric conversion element OE.

The image sensing element IS outputs the potential of the node N in a reset period and an image sensing period to the output signal line OUT, and the electronic device 100 measures a change in output voltage and creates image sensing data.

The equivalent circuit of the image sensing element IS of the present invention is not limited to the present disclosure, and the equivalent circuit of a well-known image sensing element can also be applied.

Next, an operation of illuminating an object 200 by the light emitting elements L and generating a shadow around the object 200 will be described with reference to FIGS. 3 to 5. An area formed by emitting light from the light emitting elements L simultaneously is referred to as a light emitting area LA.

FIG. 3 is a perspective view showing a state where the light emitting area LA is located close to the side E1 of the effective area AA.

The object 200 is arranged on a surface STA of a stage ST. The object 200 has a first part 201 which is in contact with the surface STA, and a second part 202 which is located on the first part 201. The second part 202 protrudes from the first part 201. The stage ST may be a desk, a floor, a ground or the like and is not limited in particular. In addition, the shape of the object 200 is merely exemplary and is not limited to this shape.

The electronic device 100 is arranged on the object 200. The electronic device 100 is arranged substantially parallel to the surface STA of the stage ST. The electronic device 100 has a light emitting surface 100A. The light emitting elements L and the image sensing elements IS described above are arranged on the light emitting surface 100A side with respect to the insulating substrate 10. The light from the light emitting elements L is emitted from the light emitting surface 100A. The electronic device 100 is arranged such that the light emitting surface 100A is opposed to the object 200.

The first controller 11 forms the light emitting area LA by turning on the light emitting elements L simultaneously. Since the light emitting elements L are located inside the effective area AA, the light emitting area LA is formed inside the effective area AA. The light emitting area LA is located close to the side E1 of the effective area AA. That is, the light emitting area LA is located close to the side edge SE1 of the electronic device 100. In addition, the light emitting area LA extends from the side E3 to the side E4.

As shown in the drawing, when light is emitted from the side edge SE1 side to the object 200, a shadow SH is generated on the side edge SE2 side with respect to the object 200. In the illustrated example, a shadow SH11 of the first part 201 is generated closer to the side edge SE2 than the first part 201, and a shadow SH21 of the second part 202 is generated closer to the side edge SE2 than the second part 202. As described above, when the light emitting area LA is located on the side edge SE1 side, it is known from the generation of the shadow SH on the side edge SE2 side that the three-dimensional structure of the object 200 is located closer to the side edge SE1 than the shadow SH.

The electronic device 100 illuminates the object 200 while moving the light emission area LA described above. The shadow SH generated by the object 200 is captured by the image sensing elements at a position opposed to the shadow SH as will be described later. The electronic device 100 stores the position and shape of the shadow SH corresponding to the position of the light emission area LA.

FIG. 4 is a perspective view showing a state where the light emitting area LA is located in the middle of the side E1 and the side E2 of the effective area AA. The configuration shown in FIG. 4 is different from the configuration shown in FIG. 3 in the position of the light emitting area LA.

The light emitting area LA is located in the middle of the side E1 and the side E2 of the effective area AA. That is, the light emitting area LA is located in the middle of the side edge SE1 and the side edge SE2 of the electronic device 100. In addition, the light emitting area LA extends from the side E3 to the side E4.

As shown in the drawing, when light is emitted from the middle of the side edge SE1 and the side edge SE2 to the object 200, the shadow SH is generated on the side edge SE1 side and the side edge SE2 side with respect to the object 200. In the illustrated example, the shadow SH11 of the first part 201 is generated closer to the side edge SE2 than the first part 201, and the shadow SH21 of the second part 202 is generated closer to the side edge SE2 than the second part 202. In addition, a shadow SH12 of the first part 201 is generated closer to the side edge SE1 than the first part 201, and a shadow SH22 of the second part 202 is generated closer to the side edge SE1 than the second part 202. As described above, when the light emitting area LA is located in the middle of the side edge SE1 and the side edge SE2, it is known from the generation of the shadow SH on both sides of the object 200 that the three-dimensional structure of the object 200 is located close to directly below the light emitting area LA.

Figure 5:
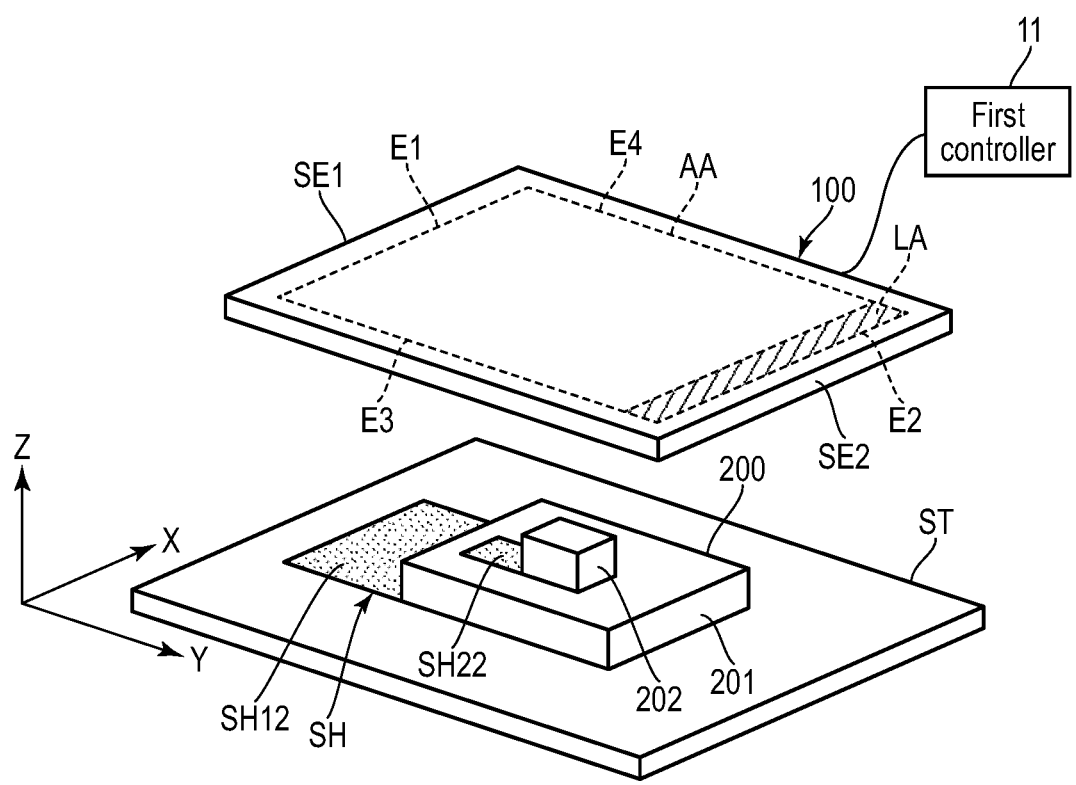
FIG. 5 is a perspective view showing a state where the light emitting area is located close to a side of the effective area.

FIG. 5 is a perspective view showing a state where the light emitting area LA is located close to the side E2 of the effective area AA. The configuration shown in FIG. 5 is different from the configuration shown in FIG. 3 in the position of the light emitting area LA.

The light emitting area LA is located close to the side E2 of the effective area AA. That is, the light emitting area LA is located close to the side edge SE2 of the electronic device 100. In addition, the light emitting area LA extends from the side E3 to the side E4.

As shown in the drawing, when light is emitted from the side edge SE2 side to the object 200, the shadow SH is generated on the side edge SE1 side with respect to the object 200. In the illustrated example, the shadow SH12 of the first part 201 is generated closer to the side edge SE1 than the first part 201, and the shadow SH22 of the second part 202 is generated closer to the side edge SE1 than the second part 202. As described above, when the light emitting area LA is located on the side edge SE2 side, it is known from the generation of the shadow SH on the side edge SE1 side that the three-dimensional structure of the object 200 is located closer to the side edge SE2 than the shadow SH.

As described with reference to FIGS. 3 to 5, it is analyzed that the three-dimensional structure of the object 200 is located on the light emission area LA side with respect to the shadow. In addition, three-dimensional data about the detailed outer shape of the object 200 can be created from the shape, width and the like of the shadow.

FIG. 6 is a plan view showing the positional relationship between the light emitting area LA and an image sensing area IA.

FIG. 6(a) shows a state where the light emitting area LA is located close to the side E1 of the effective area AA. When the first controller 11 turns on the light emitting elements L simultaneously and forms the light emitting area LA, the second controller 12 drives the image sensing elements IS simultaneously and forms the image sensing area IA. Since the image sensing elements IS are located inside the effective area AA, the image sensing area IA is formed inside the effective area AA. The image sensing area IA captures a shadow generated by an object. The electronic device 100 creates the three-dimensional data about the outer shape of the object based on a shadow image captured by the image sensing area IA.

The image sensing area IA is formed closer to the side E2 than the light emitting area LA. That is, the image sensing area IA is formed closer to the side edge SE2 than the light emitting area LA. In addition, the image sensing area IA extends from the side E3 to the side E4. Although the image sensing area IA is separated from the light emitting area LA in the illustrated example, the image sensing area IA may not be separated from the light emitting area LA. That is, all the image sensing elements IS located outside the light emitting area LA may be driven. In addition, the image sensing elements IS at a position overlapping the light emitting area LA are not driven.

FIG. 6(b) shows a state where the light emitting area LA is located in the middle of the side E1 and the side E2 of the effective area AA.

An image sensing area IA1 is formed closer to the side E1 than the light emitting area LA. That is, the image sensing area IA1 is formed closer to the side edge SE1 than the light emitting area LA. In addition, the image sensing area IA1 extends from the side E3 to the side E4. An image sensing area IA2 is formed closer to the side E2 than the light emitting area LA. That is, the image sensing area IA2 is formed closer to the side edge SE2 than the light emitting area LA. In addition, the image sensing area IA2 extends from the side E3 to the side E4. Although the image sensing areas IA1 and IA2 are separated from the light emitting area LA in the illustrated example, the image sensing areas IA1 and IA2 may not be separated from the light emitting area LA. That is, all the image sensing elements IS located outside the light emitting area LA may be driven. In addition, the image sensing elements IS at a position overlapping the light emitting area LA are not driven.

FIG. 6(c) shows a state where the light emitting area LA is located close to the side E2 of the effective area AA.

The image sensing area IA is formed closer to the side E1 than the light emitting area LA. That is, the image sensing area IA is formed closer to the side edge SE1 than the light emitting area LA. In addition, the image sensing area IA extends from the side E3 to the side E4. Although the image sensing area IA is separated from the light emitting area LA in the illustrated example, the image sensing area IA may not be separated from the light emitting area LA. That is, all the image sensing elements IS located outside the light emitting area LA may be driven. In addition, the image sensing elements IS at a position overlapping the light emitting area LA are not driven.

As described above, those of the image sensing elements IS which overlap the light emitting area LA are not driven, and those of the image sensing elements IS which are located in a different area from the light emitting area LA capture the shadow. In addition, the electronic device 100 moves the image sensing area IA according to the movement of the light emitting area LA.

According to the present embodiment, the three-dimensional data about the three-dimensional structure of the object can be obtained by capturing the shadow generated by the object while moving the position of the light emitting area LA. In addition, since which light emitting elements L emit light can be freely selected, how light is shed on the object can be adjusted according to the structure of the object. For example, when the object has a simpler structure, by moving the light emitting area LA large and reducing the number of image sensing times, the time required for image sensing can be reduced. On the other hand, when the object has a more complicated structure, by moving the light emitting area LA small and increasing the number of image sensing times, the detailed three-dimensional data of the object can be obtained.

In addition, it is possible to incorporate the above-described function into a display device which is a portable terminal carried daily such as a smartphone by mounting the image sensing elements IS on the display surface side of the display device. That is, a display device incorporating a 3D camera therein can be obtained. Furthermore, since the positional relationship between the light emitting element L and the image sensing element IS is fixed in advance, no difficult operation by the operator is required.

Figure 7:
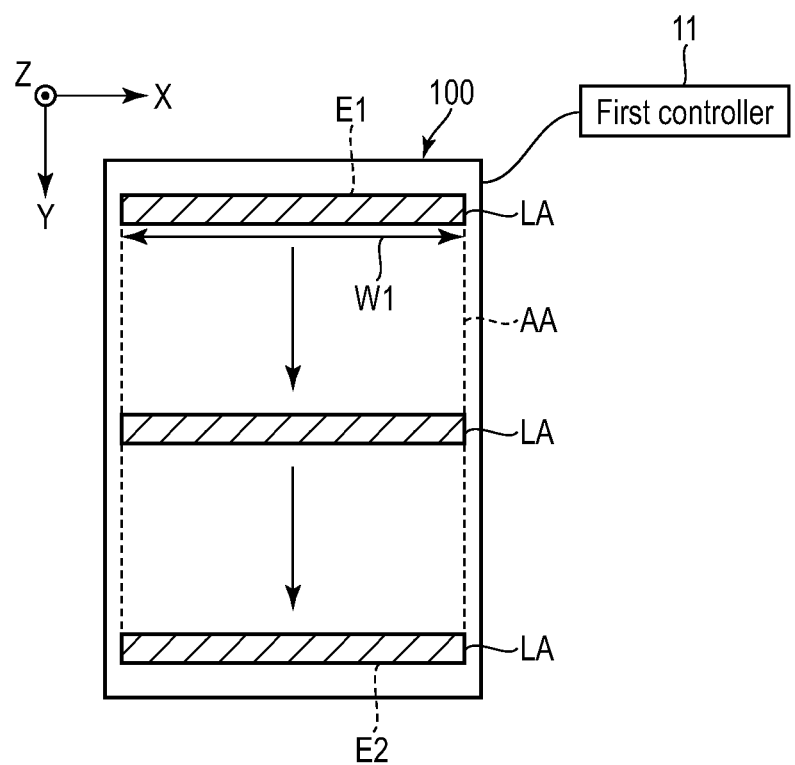
FIG. 7 is a plan view showing an operation where the light emitting area scans the inside of the effective area.

FIG. 7 is a plan view showing an operation where the light emitting area LA scans the inside of the effective area AA.

The light emitting area LA is in the form of a line. The light emitting area LA has a width W1 which is equal to the length of the side E1 of the effective area AA. The first controller 11 illuminates the object by moving the light emitting area LA along the second direction Y from one end to the other end of the effective area AA. In other words, the light emitting area LA scans the object from the side E1 to the side E2. When the light emitting area LA scans the entire effective area AA, the object can be illuminated from all directions, and detailed three-dimensional data can be obtained.

FIG. 8 is an illustration schematically showing the light emitting area LA in the first period and the second period regarding the movement of the light emitting area LA shown in FIG. 7. The unit area UI is represented as a rectangle in FIG. 8. In addition, the unit area UI where the light emitting elements L emit light is shown by hatch lines.

FIG. 8(a) shows the position of the light emitting area LA in the first period. The image sensing elements IS arranged in the unit areas UI corresponding to the light emitting area LA are not driven. The light emitting area LA is formed in the unit areas UI in rows 1 to 3. The light emitting area LA moves from the position in the first period to the position in the second period.

FIGS. 8(b), 8(c) and 8(d) show the position of the light emitting area LA in the second period.

The light emitting area LA shown in FIG. 8(b) is formed in the unit areas UI in rows 2 to 4. As compared with the first period, the light emitting area LA in the second period is moved by one row of unit areas UI. That is, the light emitting area LA in the second period is the same as the light emitting area LA in the first period in the unit areas UI in rows 2 and 3. As described above, when the light emitting area LA is partly the same between the consecutive periods, the object can be scanned with even higher definition.

The light emitting area LA shown in FIG. 8(c) is formed in the unit areas UI in rows 4 to 6. As compared with the first period, the light emitting area LA in the second period is moved by three rows of unit areas UI. That is, the light emitting area LA in the second period is formed from the next row, that is, from row 4 with respect to the unit areas UI in rows 1 to 3 where the light emitting area LA in the first period is formed. As described above, when the light emitting area LA is continuous but is not the same between the consecutive periods, the object can be scanned with high definition in less time than the example of FIG. 8(b).

The light emitting area LA shown in FIG. 8(d) is formed in the unit areas UI in rows 6 to 8. As compared with the first period, the light emitting area LA in the second period is moved by five rows of unit areas UI. That is, the light emitting area LA in the second period is formed skipping two rows of unit areas UI, that is, from row 6 with respect to the unit areas UI in rows 1 to 3 where the light emitting area LA in the first period is formed. As described above, when the light emitting area LA is discontinuous between the consecutive period, the object can be scanned in even less time than the example of FIG. 8(c). In addition, also when it is determined from the structure of the object that high definition scanning is not required, the light emitting area LA does not need to be continuous between the consecutive periods.

Figure 9:
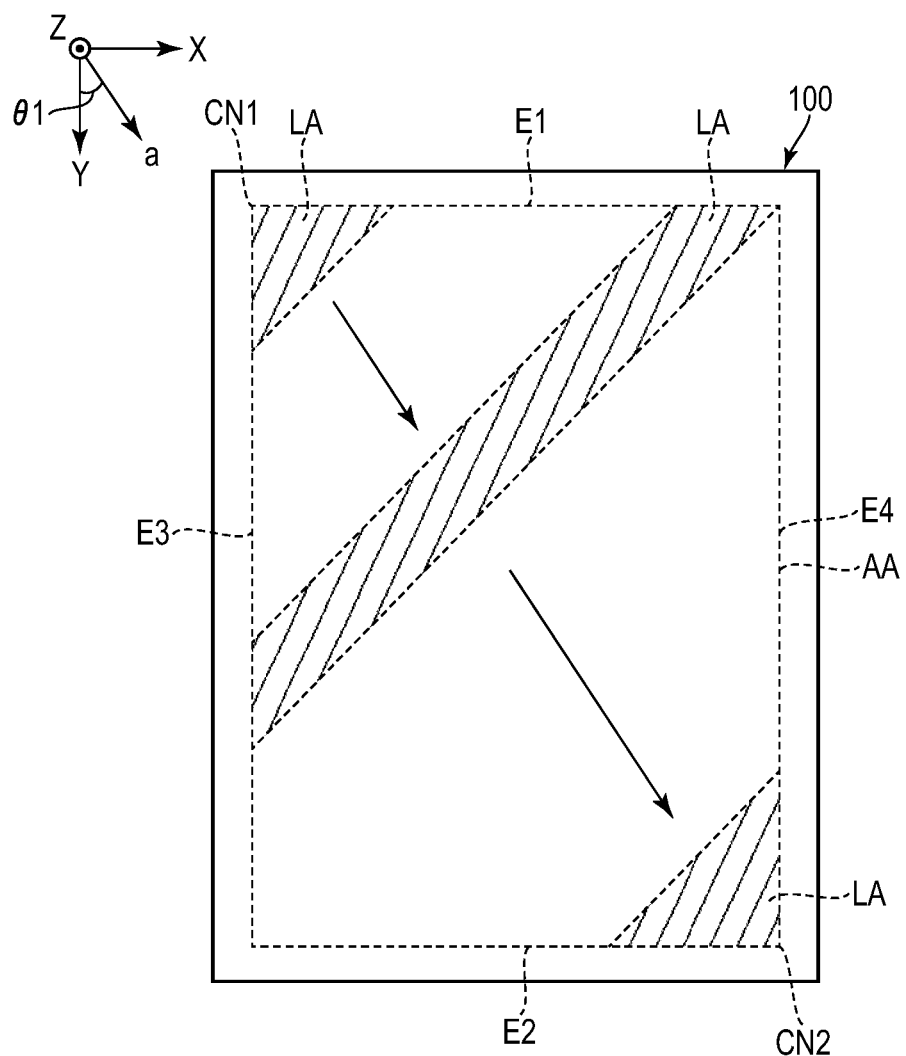
FIG. 9 is a plan view showing another example of the operation where the light emitting area scans the inside of the effective area.

FIG. 9 is a plan view showing another example of the operation where the light emitting area LA scans the inside of the effective area AA. The example shown in FIG. 9 is different from the example shown in FIG. 7 in the travel direction of the light emitting area LA. Here, a direction intersecting both the first direction X and the second direction Y is referred to as a direction a. The direction a is inclined at a first angle θ1 counterclockwise with respect to the second direction Y.

The light emitting area LA scans the object along the direction a from the corner CN1 to the corner CN2. That is, the light emitting area LA travels obliquely with respect to the side E1 and the side E3 of the effective area AA.

Figure 10:
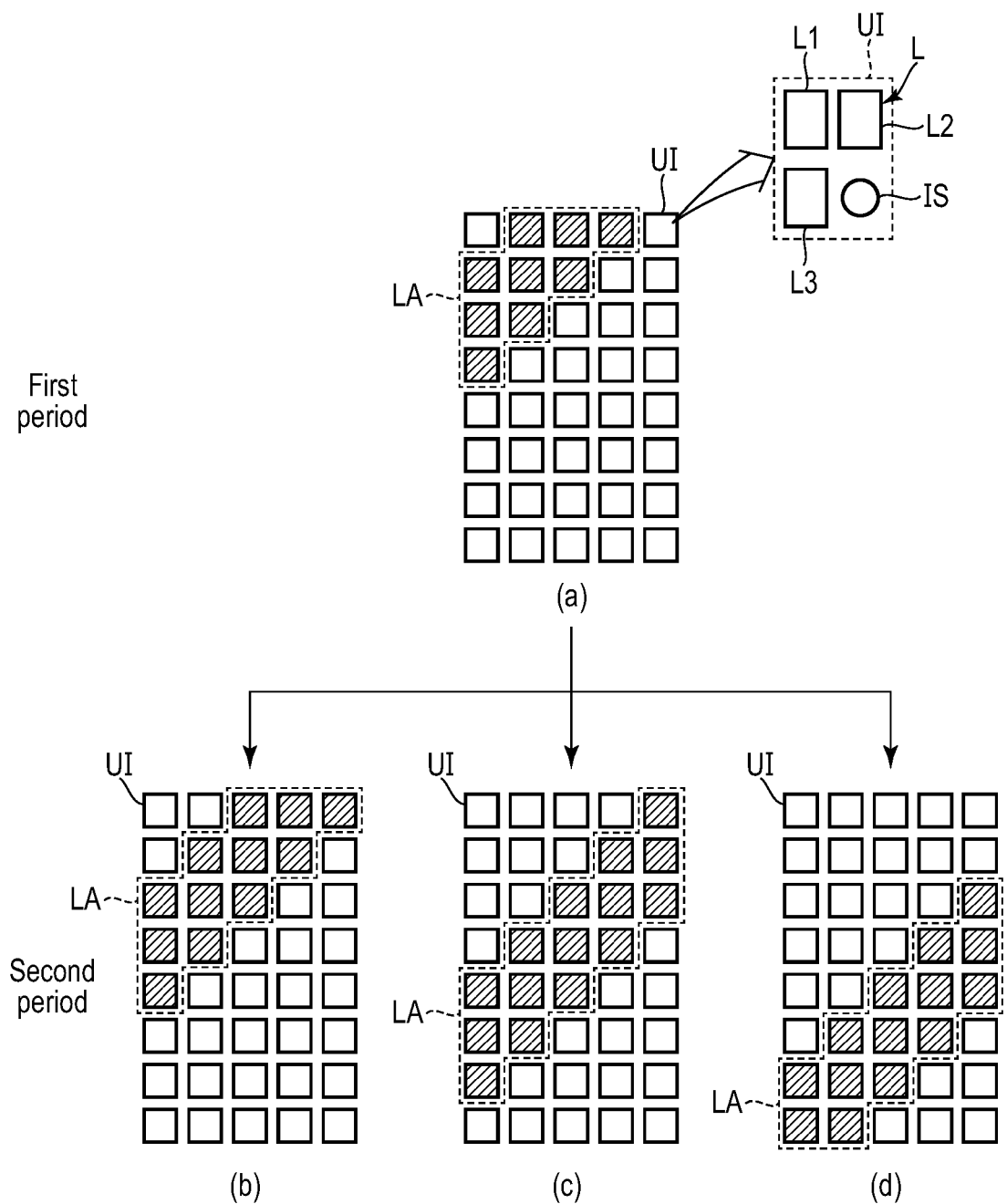
FIG. 10 is an illustration schematically showing the light emitting area in the first period and the second period regarding the movement of the light emitting area shown in FIG. 9.

FIG. 10 is an illustration schematically showing the light emitting area LA in the first period and the second period regarding the movement of the light emitting area LA shown in FIG. 9.

FIG. 10(a) shows the position of the light emitting area LA in the first period. The light emitting area LA is formed in the unit areas UI in columns 2 to 4 of row 1, columns 1 to 3 of row 2, columns 1 and 2 of row 3, and column 1 of row 4. The light emitting area LA moves from the position in the first period to the position in the second period.

FIGS. 10(b), 10(c) and 10(d) show the position of the light emitting area LA in the second period.

The light emitting area LA shown in FIG. 10(b) is formed in the unit areas UI in columns 3 to 5 of row 1, columns 2 to 4 of row 2, columns 1 to 3 of row 3, column 1 and 2 of row 4 and column 1 of row 5. As compared with the first period, the light emitting area LA in the second period is moved by one row of unit areas UI. That is, the light emitting area LA in the second period is the same as the light emitting area LA in the first period in part of the unit areas UI. As described above, when the light emitting area LA is partly the same between the consecutive periods, the object can be scanned with even higher definition.

The light emitting area LA shown in FIG. 10(c) is formed in the unit areas UI in column 5 of row 1, columns 4 and 5 of row 2, columns 3 to 5 of row 3, columns 2 to 4 of row 4, columns 1 to 3 of row 5, columns 1 and 2 of row 6, and column 1 of row 7. As compared with the first period, the light emitting area LA in the second period is moved by three rows of unit areas UI. That is, the light emitting area LA in the second period is formed from the next row with respect to the unit areas UI where the light emitting area LA in the first period is formed. As described above, when the light emitting area LA is continuous but is not the same between the consecutive periods, the object can be scanned with high definition in less time than the example of FIG. 10(b).

The light emitting area LA shown in FIG. 10(d) is formed in the unit areas UI in column 5 of row 3, columns 4 and 5 of row 4, columns 3 to 5 of row 5, columns 2 to 4 of row 6, columns 1 to 3 of row 7, and columns 1 and 2 of row 8. As compared with the first period, the light emitting area LA in the second period is moved by five rows of unit areas UI. That is, the light emitting area LA in the second period is formed skipping two rows of unit areas UI with respect to the unit areas UI where the light emitting area LA in the first period is formed. As described above, when the light emitting area LA is discontinuous between the consecutive period, the object can be scanned in even less time than the example of FIG. 10(c).

FIG. 11 is a plan view showing an operation where the light emitting area LA scans the inside of the effective area AA in two directions.

The operation shown in FIG. 11(a) is the same as the operation shown in FIG. 7. The first controller 11 illuminates the object by moving the light emitting area LA along the second direction Y from one end to the other end of the effective area AA. In other words, the light emitting area LA scans the object from the side E1 to the side E2.

Next, scanning is performed as shown in FIG. 11(b). The light emitting area LA is in the form of a line. The light emitting area LA has a width W2 which is equal to the length of the side E3 of the effective area AA. The first controller 11 illuminates the object by moving the light emitting area LA along the first direction X from one end to the other end of the effective area AA. In other words, the light emitting area LA scans the object from the side E3 to the side E4.

When the object is scanned from two different directions, more detailed three-dimensional data of the object can be obtained.

Figure 12:
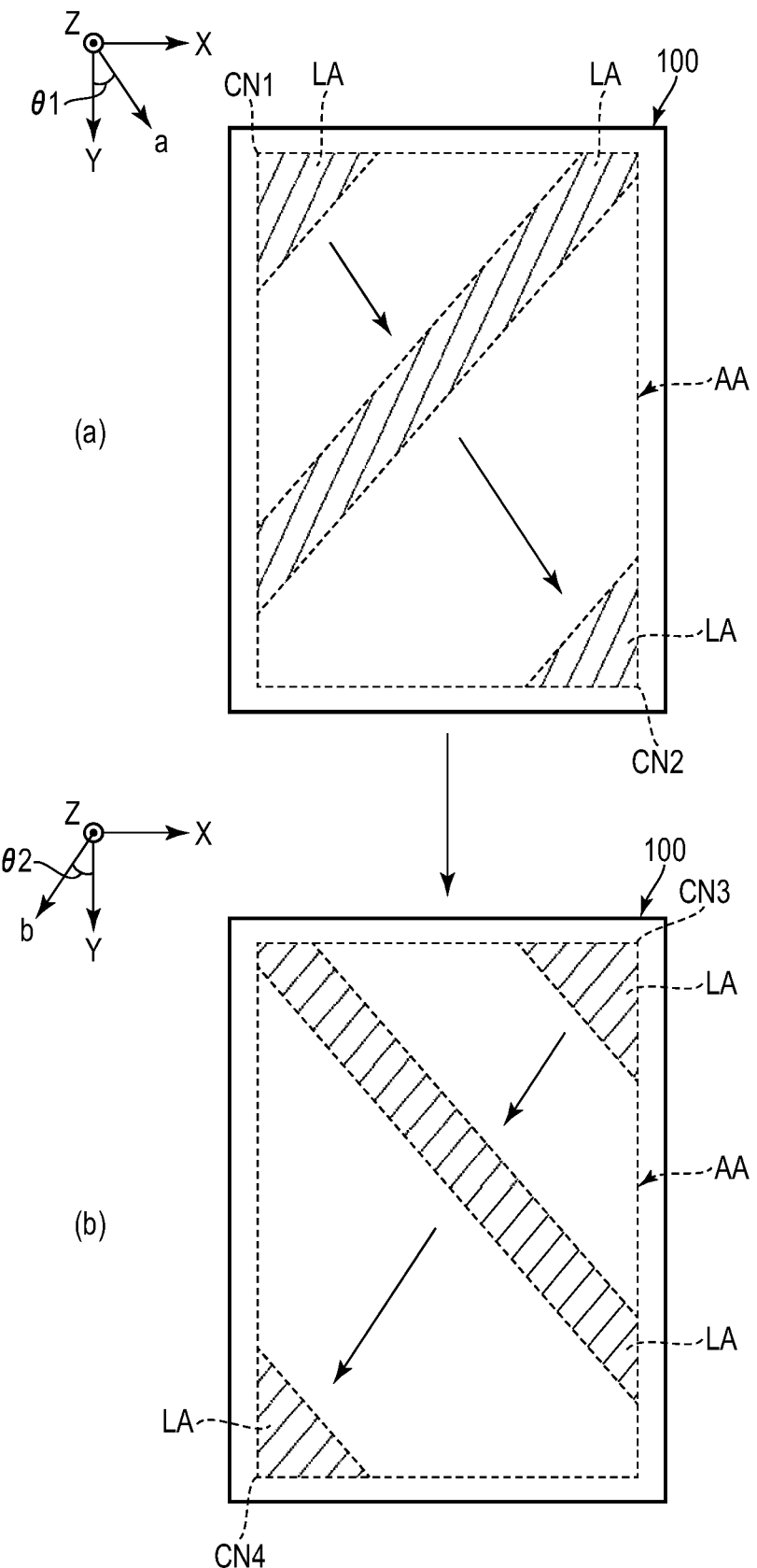
FIG. 12 is a plan view showing another example of the operation where the light emitting area scans the inside of the effective area in two directions.

FIG. 12 is a plan view showing another example of the operation where the light emitting area LA scans the inside of the effective area AA in two directions.

The operation shown in FIG. 12(a) is the same as the operation shown in FIG. 9. The light emitting area LA scans the object along the direction a from the corner CN1 to the corner CN2.

Next, scanning is performed as shown in FIG. 12(b). Here, a direction intersecting both the first direction X and the second direction Y is referred to as a direction b. The direction b is inclined at a second angle θ2 clockwise with respect to the second direction Y. The first angle θ1 and the second angle θ2 are, for example, equal. The light emitting area LA scans the object along the direction b from the corner CN3 to the corner CN4.

When the object is scanned from two different directions, more detailed three-dimensional data of the object can be obtained.

FIG. 13 is a plan view showing another example of the operation where the light emitting area LA scans the inside of the effective area AA. The example shown in FIG. 13 is different from the example shown in FIG. 7 in the shape of the light emitting area LA. Whereas the light emitting area LA shown in FIG. 7 is in the form of a line, the light emitting area LA shown in FIG. 13 is in the form of a dot.

A width W11 along the first direction X of the light emitting area LA is formed less than the length of the side E1 of the effective area AA. In addition, a width W21 along the second direction Y of the light emitting area LA is formed less than the length of the side E3 of the effective area AA.

The light emitting area LA starts moving from the corner CN1. The light emitting area LA moves parallel to the first direction X, and after contacting the side E4, the light emitting area LA moves to the next row in the second direction Y. Then, the light emitting area LA moves parallel to the first direction X to the opposite side, and after contacting the side E3, the light emitting area LA moves to the next row in the second direction Y. The light emitting area LA illuminates the object by repeating this operation from the side E1 to the side E2 and moving over the entire effective area AA.

FIG. 14 is an illustration schematically showing the light emitting area LA in the first period and the second period regarding the movement of the light emitting area LA shown in FIG. 13.

FIG. 14(a) shows the position of the light emitting area LA in the first period. The light emitting area LA is formed in the unit areas UI in rows 1 to 3 and columns 1 to 3. The light emitting area LA moves from the position in the first period to the position in the second period.

FIGS. 14(b), 14(c) and 14(d) show the position of the light emitting area LA in the second period.

The light emitting area LA shown in FIG. 14(b) is formed in the unit areas UI in rows 1 to 3 and columns 2 to 4. As compared with the first period, the light emitting area LA in the second period is moved by one column of unit areas UI. That is, the light emitting area LA in the second period is the same as the light emitting area LA in the first period in the unit areas UI in columns 2 and 3. As described above, when the light emitting area LA is partly the same between the consecutive periods, the object can be scanned with even higher definition.

The light emitting area LA shown in FIG. 14(c) is formed in the unit areas UI in rows 1 to 3 and columns 4 to 6. As compared with the first period, the light emitting area LA in the second period is moved by three columns of unit areas UI. That is, the light emitting area LA in the second period is formed from the next column, that is, from column 4 with respect to the unit areas UI in columns 1 to 3 where the light emitting area LA in the first period is formed. As described above, when the light emitting area LA is continuous but is not the same between the consecutive periods, the object can be scanned with high definition in less time than the example of FIG. 14(b).

The light emitting area LA shown in FIG. 14(d) is formed in the unit areas UI in rows 1 to 3 and columns 6 to 8. As compared with the first period, the light emitting area LA in the second period is moved by five columns of unit areas UI. That is, the light emitting area LA in the second period is formed skipping two columns of unit areas UI, that is, from column 6 with respect to the unit areas UI in columns 1 to 3 where the light emitting area LA in the first period is formed. As described above, when the light emitting area LA is discontinuous between the consecutive periods, the object can be scanned in even less time than the example of FIG. 14(c).

Figure 15:
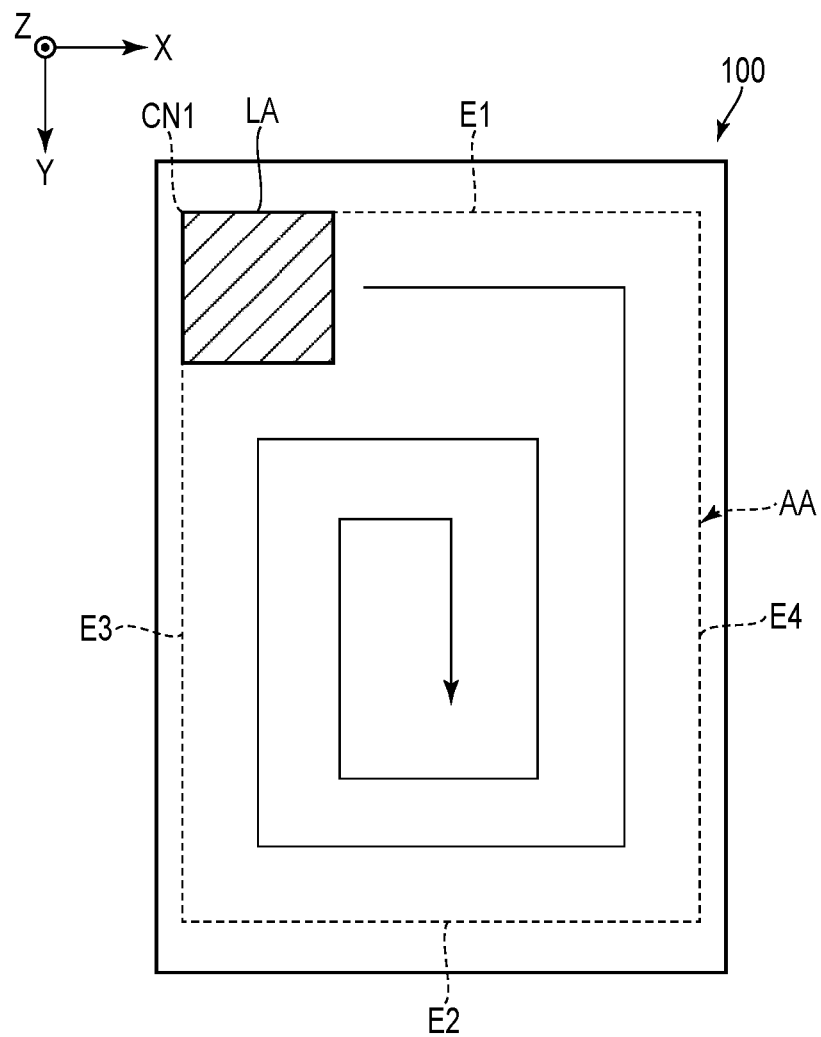
FIG. 15 is a plan view showing another example of the operation where the light emitting area scans the inside of the effective area.

FIG. 15 is a plan view showing another example of the operation where the light emitting area LA scans the inside of the effective area AA. The example shown in FIG. 15 is different from the example shown in FIG. 13 in the travel direction of the light emitting area LA.

The light emitting area LA starts moving from the corner CN1. The light emitting area LA moves along the side E1, moves along the side E4, moves along the side E2, and moves along the side E3. Then, the light emitting area LA moves again in the same manner but more inward than the already traveled area. The light emitting area LA illuminates the object by repeating this operation from the corner CN1 to the central part of the electronic device 100 and moving over the entire effective area AA.

In the examples shown in FIGS. 7, 9, 11, 12, 13 and 15, the light emitting area LA scans the entire effective area AA. However, for example, the electronic device 100 may roughly determine the area of the object after capturing the object once by the image sensing elements IS, and may only scan a necessary area by the light emitting area LA. That is, the light emitting elements L located at a certain distance or more from the object may not emit light.

FIG. 16 is a plan view schematically showing another example of the electronic device 100 according to the present embodiment. The configuration shown in FIG. 16 is different from the configuration shown in FIG. 1 in that the electronic device 100 comprises three image sensing elements IS1, IS2 and IS3.

The image sensing element IS1 senses, for example, red (R) light emitted from the light emitting element L1. The image sensing element IS2 senses, for example, green (G) light emitted from the light emitting element L2. The image sensing element IS3 senses, for example, blue (B) light emitted from the light emitting element L3. In such a configuration, for example, when the light emitting elements L of different colors emit light at the respective positions inside the effective area due to image display or the like, the shapes formed by the light emitting elements L1, L2 and L3 of the respective colors can be captured simultaneously by the image sensing elements IS1, IS2 and IS3.

As described above, according to the present embodiment, a method for controlling an electronic device capable of capturing a shadow generated by illuminating an object can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for controlling an electronic device comprising:
    illuminating an object while moving a light emitting area formed by turning on a plurality of light emitting elements simultaneously;
    capturing a shadow generated by the object by a plurality of image sensing elements on a same substrate as the light emitting elements; and
    creating three-dimensional data about an outer shape of the object based on a shadow image, wherein
    the electronic device includes a plurality of unit areas arranged in a matrix in a first direction and a second direction intersecting the first direction,
    each of the unit areas includes at least one or more of the light emitting elements and one of the image sensing elements,
    when those of the image sensing elements of the unit areas, which are located in the light emitting area, are not driven, all others of the image sensing elements of the unit areas, which are located outside the light emitting area, are driven and capture the shadow, and
    when those of the light emitting elements of the unit areas, which are located in the light emitting area, illuminate the object, all others of the light emitting elements of the unit areas, which are located outside the light emitting area, do not illuminate the object.

2. The method for controlling the electronic device of claim 1, wherein the light emitting area is in a form of a line, and illuminates the object by moving along the first direction from one end to another end of an effective area.

3. The method for controlling the electronic device of claim 2, wherein the light emitting area illuminates the object by moving along the second direction from one end to another end of the effective area.

4. The method for controlling the electronic device of claim 1, wherein the light emitting area is in a form of a dot, and moves in the first direction and the second direction, and illuminates the object by moving over an entire effective area.

* * * * *